United States Patent

Nørholmen

[11] Patent Number: 5,909,007
[45] Date of Patent: Jun. 1, 1999

[54] BENDING RESTRICTOR

[75] Inventor: John Øivind Nørholmen, Lørenskog, Norway

[73] Assignee: Alcatel, France

[21] Appl. No.: 08/899,320

[22] Filed: Jul. 23, 1997

[30] Foreign Application Priority Data

Aug. 14, 1996 [NO] Norway .................................... 963385

[51] Int. Cl.$^6$ ...................................................... H01B 7/24
[52] U.S. Cl. ..................... 174/135; 174/136; 174/DIG. 8
[58] Field of Search .............................. 174/136, DIG. 8,
174/DIG. 12, 135, 69, 68.1, 63.3, 70 R,
111; 138/110, 153; 285/115, 116

[56] References Cited

U.S. PATENT DOCUMENTS

| Re. 35,820 | 6/1998 | Guginsky | 174/102 R |
|---|---|---|---|
| 1,987,794 | 1/1935 | Phillips | 174/109 |
| 3,060,972 | 10/1962 | Sheldon | 138/120 |
| 4,367,967 | 1/1983 | Albert, Jr. | 403/41 |
| 4,739,801 | 4/1988 | Kimura et al. | 138/120 |
| 5,036,166 | 7/1991 | Monopoli | 174/128.1 |
| 5,134,251 | 7/1992 | Martin | 174/136 |
| 5,254,809 | 10/1993 | Martin | 174/68.1 |

FOREIGN PATENT DOCUMENTS

| 2018527 | 10/1979 | United Kingdom | 174/DIG. 8 |
|---|---|---|---|
| 2054781 | 2/1981 | United Kingdom | 174/DIG. 8 |

*Primary Examiner*—Kristine Kincaid
*Assistant Examiner*—Dhiru R. Patel
*Attorney, Agent, or Firm*—Ware, Fressola, Van der Sluys & Adolphson LLP

[57] ABSTRACT

A device for restricting the bending diameter and bending strain exerted on elongated articles (1) such as cables, pipes, umbilicals and other elongated articles is used when installating such articles from a cable ship to a sea bed. There is used a number of wire elements (32,33) which are arranged for tensioning the annular elements into contact with each other. The wire elements (32,33 on the annular elements to ensure uniform compression of these elements.

19 Claims, 2 Drawing Sheets

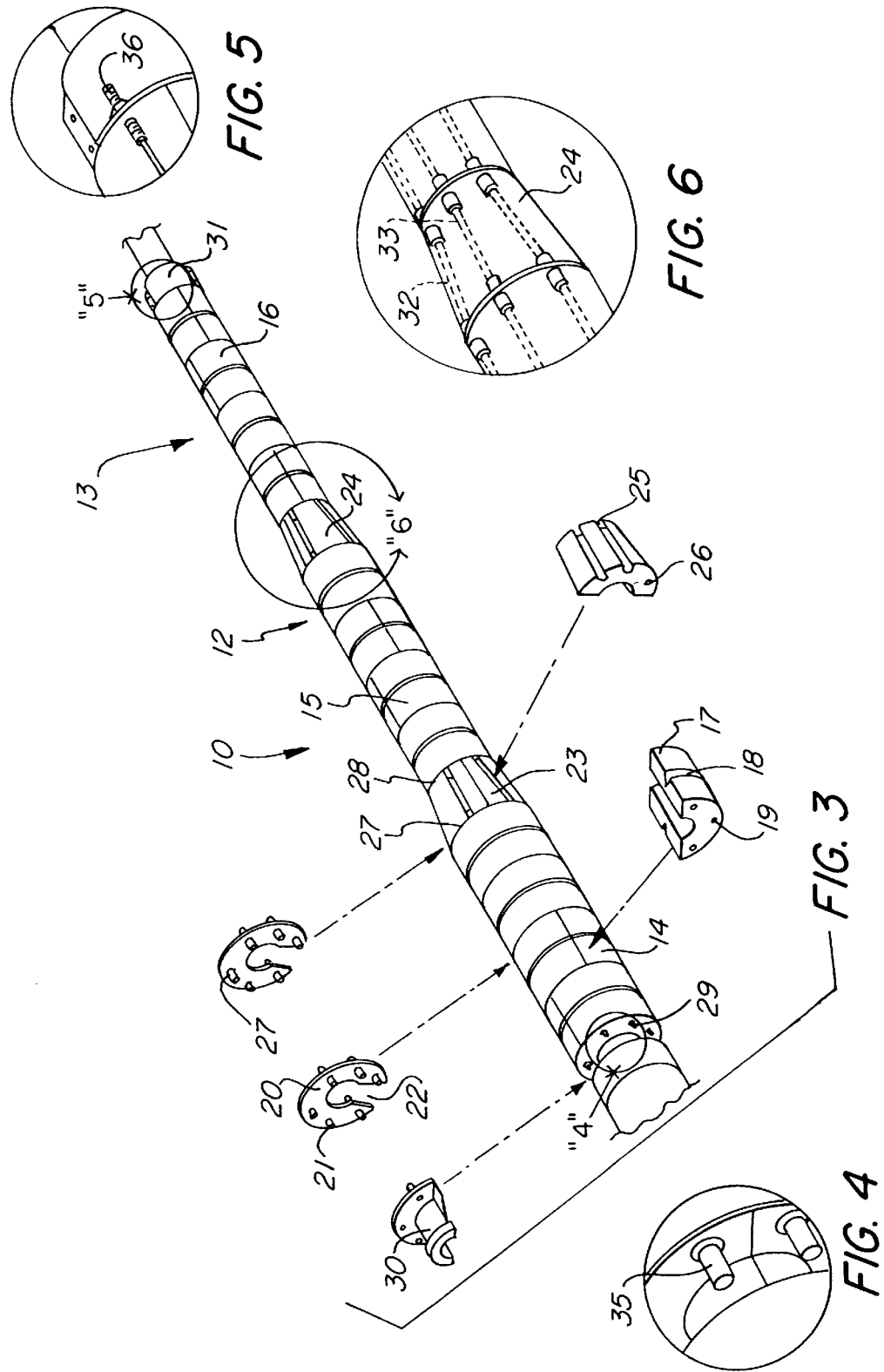

BENDING RESTRICTOR

BACKGROUND OF THE INVENTION

1. Technical Field

The present invention relates to bending restrictors and bending strain restrictors designed for cables, pipes and other elongated articles such as umbilicals, which are installed in connection with offshore constructions. In the following the invention will be described in connection wish installation of a cable from a cable ship.

2. Description of the Prior Art

Offshore cables are designed to withstand strains caused by bending under tension such as passing the cable over a bow wheel of the ship. The cables are also to a certain extent designed to withstand repeated flexing after installation and during normal operation. In most cases at least one end of the cable is provided with a termination head for simplifying interconnection of the cable with an offshore construction such as a template arranged on the sea bed. In such cases a critical installation phase is to bring the cable with the termination head safely from the cable ship down to the template. Such termination heads may weigh 5 tons and more.

Bending strain restrictors are normally designed such that the combined stiffness of the elongated article itself and the restrictor is gradually reduced along the article from the position where the restrictor is clamped to installation head.

The main purpose of a bending restrictor (BR) is to limit the bending diameter of a cable to a minimum value, whereas the main purpose of a bending strain restrictor (BSR) is to restrict the strain in the cable when it is bent.

SUMMARY OF THE INVENTION

An object of the invention is to provide an improved bending strain restrictor which is reliable over a long period of time when submerged in seawater and which can be adapted to various types of elongated articles. The features of the invention are defined in the claims.

With the invention there is obtained a combined bending restrictor and bending strain restrictor which can be installed on a cable termination head before lowering the head and the cable safely to the sea bed. There is also obtained a BSR which may be used when lowering a cable bight and joint to the sea bed. The restrictor is assembled from parts chosen individually for each case.

BRIEF DESCRIPTION OF THE DRAWINGS

Above mentioned and other features and objects of the present invention will clearly appear from the following detailed description of embodiments of the invention taken in conjunction with the drawings, where

FIGS. 3–6 show details of the bending restrictor of the invention.

DETAILED DESCRIPTION OF THE INVENTION

Figure 1A:
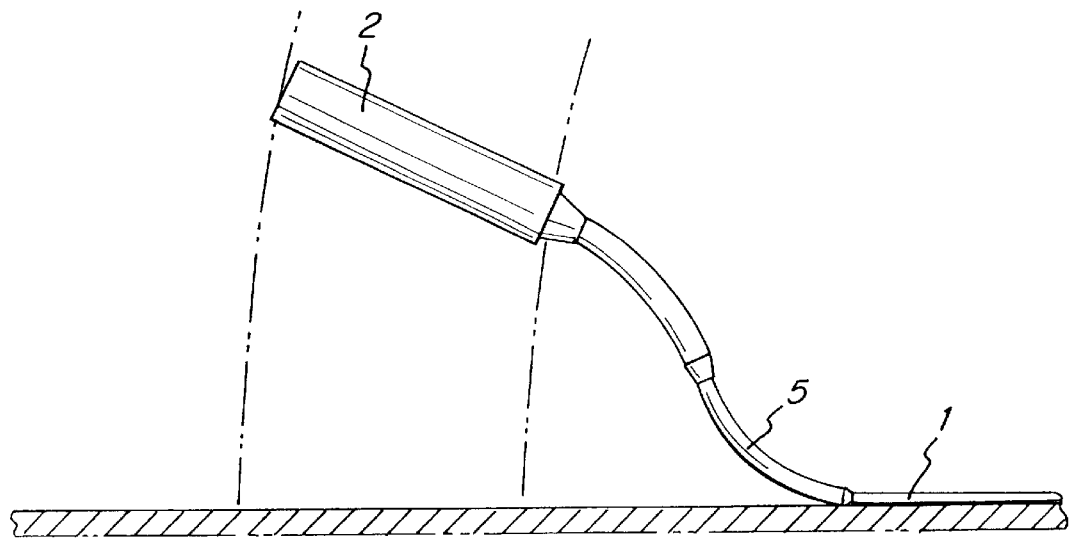
FIG. 1 illustrates various steps in lowering a cable termination with a bending restrictor to the sea bed.

In FIG. 1 is illustrated an elongated article 1 such as a cable, a pipe or an umbilical with a termination head 2 which is about to be lowered from a cable ship (not shown) into installation with a template 3 on the sea bed 4. Two steps are shown,—the first step A when the cable 1 with its cable head 2 are on their way down,—and a step B where the head (and the cable) rests on the sea bed ready to be pulled into the template 3. (The steps B and A also respectively illustrate detachment of the head from the template,—and lifting of the cable and head to the surface). After installation the cable 2 may be buried in the sea bed. The cable head 2 is provided with a bending restrictor 5 designed in accordance with the present invention to prevent undue bending of the cable. A typical installation head 3 may weigh 5 tons or more and the cable could have a minimum bending diameter of some 10 meters. Buoyancy devices (not shown) could be used during the lowering operation. The bending restrictor could have a length of some 10 meters and its bending characteristics could be varied along its length.

Figure 2:
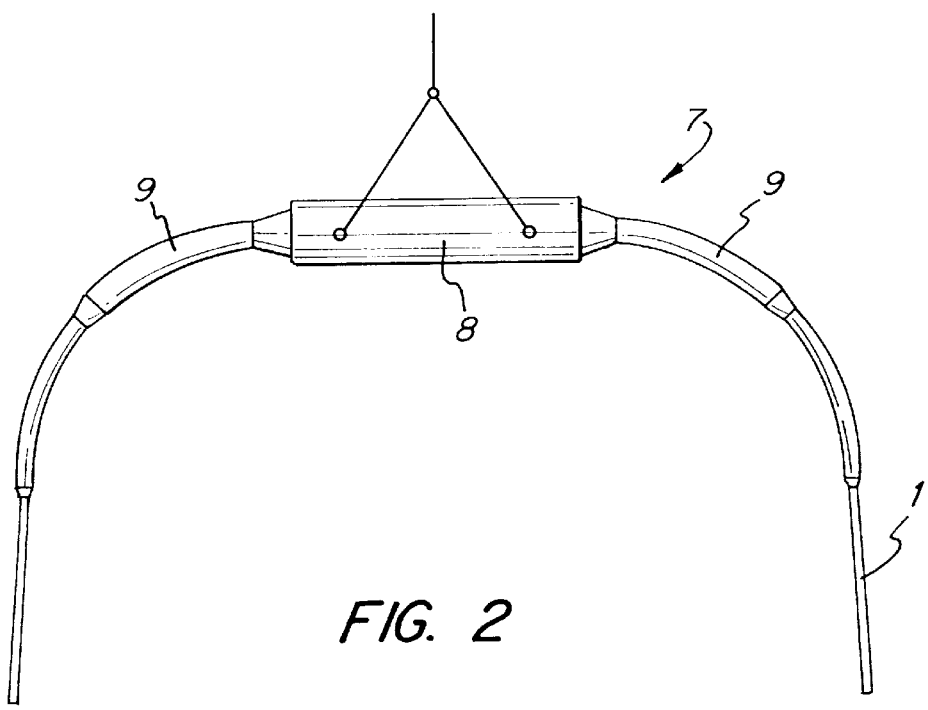
FIG. 2 shows bending restrictors used on a cable bight.

In FIG. 2 is illustrated a bight 7 of a elongated article including a repair joint 8 with two bending strain restrictors 9. The bending strain restrictors enable lowering of the repair joint and the bight without damaging the article.

In FIG. 3 is illustrated a bending restrictor 10 of the invention in greater detail. The restrictor is assembled from a number of interlockable elements arranged side by side. The elements are arranged in three sections 11, 12 and 13 having individual bending characteristics. The number of sections can be varied and the number of elements within each section can be varied. In the example shown, each section 11, 12 and 13 has a number of elements 14, 15 and 16 respectively. The element 14 consists of two identical semi-annular parts 17. The part 17 is provided wrath a circumferential slot 18 having a V-shaped crossection defining its bending characteristics. The semi-annular part 17 is also provided with same (three) through-holes 19 the purpose of which will be explained later. The part 17 may be made from a natural rubber material NR having a 50–80 Shore rating, which is capable of being substantially rigid and resistive to compression, but still bendable in the slotted region. The life of the rubber elements should not be less than 20 years when exposed to seawater. The elements 15 and 16 are similar to the element 14. Their length and diameter and the depth and angle of the circumferential slot can, however, be different.

Adjacent pairs of the elements 14 are interlocked by means of interlocking means such as a metal washer 20 having a number of tube pieces or tubings 21 suitable for being inserted into the through-holes 19 of the parts 17 and elements 14. The individual components of the bending restrictor 10 can be assembled directly on the longitudinal article—or on a mandrel (not shown) in the case that a complete restrictor shall be placed on a cable end—and for that purpose each of the washers 20 is provided with a radial slot 22. When assembling the section 11, the meeting surfaces of the semi-annular parts 17 are angularly displaced, in the example with 120°, as are the slots 22 of the washers 20. The sections 12 and 13 are assembled similarly.

For the purpose of interconnecting and interlocking sections having different diameters, there are provided elements 23 and 24 having tapered outer surfaces. These elements also consist of two parts 25 having a number of longitudinal slots 26. Other details of a tapered element 24 is illustrated in FIG. 6. Washers 27 and 28 interlock the tapered element 23 with neighbor elements 14 and 15 of the sections 11 and 12. These washers which may be thicker than the washer 20, also have a number of tubings like the tubings 21 of the washer 20. The assembly of the tapered element 24 is similar to that of the element 23. The left end of the restrictor 10 is fitted with a device 29 suitable for connecting the restrictor to an installation head (not shown), or to a repair joint. An enlarged detail of the device 29 which is assembled from two identical pares 30, is shown in FIG. 4.

A detail of a terminating device 31 of the restrictor 10 is shown in FIG. 5, whereas details of the tapered element 24 are illustrated in FIG. 6. In this figure part of the element 24 has been removed to reveal details of washers similar to the washer 27 having tubings 21. When the elements mentioned have been assembled, or during the assembly operation, wires 32, 33 are inserted through the tubings 21, the through-holes and the slots of all the elements. These wires are tensioned by locking one end 35—FIG. 4—of each wire to the end element 29, FIG. 4, and by making a threaded connection 36 at the end device 31, FIG. 5. Based on stiffness requirements, a correct design for obtaining appropriate corresponding tension will be adopted. The tension on each wire could be 100 kN and higher. The elements 23 and 24 which are shown with open slots could alternatively have through-holes such as the holes 19 of the element 14. Similarly, the elements 14, 15 and 16 may have open slots such as the slots 26 of the element 23 instead of the through-holes 19.

Care should be taken to make sure that the wires 32 and 33 pass freely through the tubings 21 of the washers 20, 27, 28 aso, so as neither to destroy the surface of the wires, nor the surface of the elements 14–16, 23–24. The number of wires 32,33 should be such that at least two wires are stretched simultaneously. Six wires are considered suitable. The life of the bending restrictor should be at least 20 years and the materials should be chosen for the purpose to ensure such life.

In the bending strain restrictor 10 exemplified above, the inner sections 11 and 12 may be designed as bending restrictors, whereas the outer section 13 restricts the bending strain. The V-shaped slots of the elements 14 and 15 define a minimum bending diameter of sections 11 and 12 respectively,—whereas section 13,—due to the lesser diameter of its elements 16 can be bent beyond the diameter defined by the V-shaped slots of the element 16 and restrict strain in the elongated article by compressing the material of elements 16. The elements 16 could be made from a material more flexible than the material of the elements 14 and 15.

The above detailed description of embodiments of this invention must be taken as examples only and should not be considered as limitations on the scope of protection. In the example shown for a cable having a diameter in the order of 130–150 mm, the inner diameter of the restrictor could be 180 mm, whereas the outer diameter of the section 11, 12 and 13 could be 600 mm, 500 mm and 400 mm respectively. The elements may be molded in sets of casting forms assembled from inner mold elements having say two different diameters, and outer mold elements having several outer diameters.

I claim:

1. A combination used in an underwater location comprising:
   (a) an elongated article selected from the group consisting of a cable, pipe and umbilical; and
   (b) a bending restrictor having a plurality of annular elements arranged around the elongated article and a plurality of wire elements arranged for tensioning the annular elements into contact with each other, the wire elements are equally distributed with respect to the annular elements to ensure uniform compression of the annular elements, thereby restricting bending strain and minimum bending diameter of the elongated article during lowering of the combination to the underwater location.

2. A combination according to claim 1, wherein groups of the annular elements have different diameters.

3. A combination according to claim 2, wherein the plurality of annular elements include at least one interface annular element having a tapered outer surface to constitute an interface between the groups of the annular elements.

4. A combination according to claim 1, wherein the wire elements are made from a corrosion proof material chosen from a group consisting of stainless steel and galvanized steel thereby providing tensile strength.

5. A combination according to claim 1, wherein at least one of the wire elements is inserted longitudinally through the annular elements and through annular element interlocking means.

6. A combination according to claim 1, wherein the annular elements are provided with at least one circumferential slot and the at least one slot has a V-shaped cross-section defining a bending curve of the elongated article.

7. A combination according to claim 1, wherein each of the annular elements includes two semi-annular parts and interlocking means arranged between at least two of the annular elements.

8. A combination according to claim 7, wherein the interlocking means comprises a metal washer having a radial slot.

9. A combination according to claim 7, wherein the interlocking means includes tubing means inserted into corresponding reception means in the annular elements.

10. A combination according to claim 1, further including end elements tensioning the wire elements.

11. A combination according to claim 1, wherein the annular elements are made of a natural rubber material having a 50–80 Shore rating.

12. Bending restrictor for an elongated article, comprising a plurality of annular elements arranged around an elongated article and a plurality of wire elements arranged for tensioning the annular elements into contact with each other, wherein at least one of the wire elements is inserted longitudinally through the annular elements and through annular element interlocking means.

13. Bending restrictor for an elongated article, comprising a plurality of annular elements arranged around an elongated article and a plurality of wire elements arranged for tensioning the annular elements into contact with each other, wherein the annular elements are provided with at least one circumferential slot and the at least one slot has a V-shaped cross-section defining a bending curve of the elongated article.

14. Bending restrictor for an elongated article, comprising a plurality of annular elements arranged around an elongated article and a plurality of wire elements arranged for tensioning the annular elements into contact with each other, wherein each of the annular elements includes two semi-annular parts and interlocking means arranged between at least two of the annular elements.

15. Bending restrictor according to claim 14, wherein the interlocking means comprises a metal washer having a radial slot.

16. Bending restrictor according to claim 14, wherein the interlocking means includes tubing means inserted into corresponding reception means in the annular elements.

17. Bending restrictor for an elongated article, comprising a plurality of annular elements arranged around an elongated article and a plurality of wire elements arranged for tensioning the annular elements into contact with each other, wherein groups of the annular elements have different diameters and wherein the plurality of annular elements include at least one interface annular element having a tapered outer surface to constitute an interface between the groups of the annular elements.

18. Bending restrictor for an elongated article, comprising a plurality of annular elements arranged around an elongated article and a plurality of wire elements arranged for tensioning the annular elements into contact with each other, further including end elements tensioning the wire elements.

19. Bending restrictor for an elongated article, comprising a plurality of annular elements arranged around an elongated article and a plurality of wire elements arranged for tensioning the annular elements into contact with each other, wherein the annular elements are made of a natural rubber material having a 50–80 Shore rating.

\* \* \* \* \*

UNITED STATES PATENT AND TRADEMARK OFFICE
CERTIFICATE OF CORRECTION

PATENT NO. : 5,909,007
DATED : June 1, 1999
INVENTOR(S) : John Oivind Norholmen

It is certified that error appears in the above-identified patent and that said Letters Patent is hereby corrected as shown below:

In abstract, line 7, after "(32,33", --) are equally distributed in or-- should be inserted.

In column 1, line 10, "wish" should be --with--.

Figure 1B:
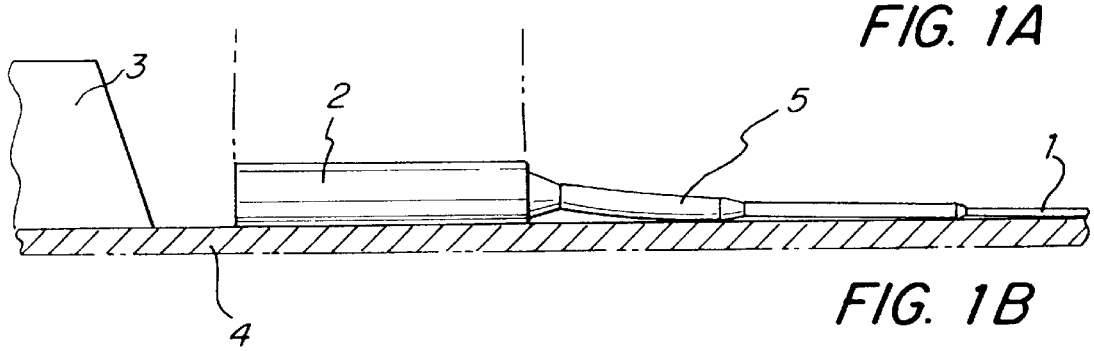

In column 1, line 54, "Fig. 1 illustrates" should be --Figures 1A and 1B illustrate--.

In column 1, line 64, "In Fig. 1 is illustrated" should be --Figures 1A and 1B illustrate--.

In column 2, line 1, "A" should be --of Figure 1A--.

In column 2, line 2, "B" should be --of Figure 1B--.

In column 2, line 5, "B and A" should be --of Figures 1A and 1B--.

In column 2, line 29, "wrath" should be --with--.

In column 2, line 32, "same" should be --some--.

In column 3, line 2, "pares" should be --parts--.

Signed and Sealed this

Eighteenth Day of April, 2000

Attest:

Q. TODD DICKINSON

*Attesting Officer*  *Director of Patents and Trademarks*